Patented Mar. 1, 1932

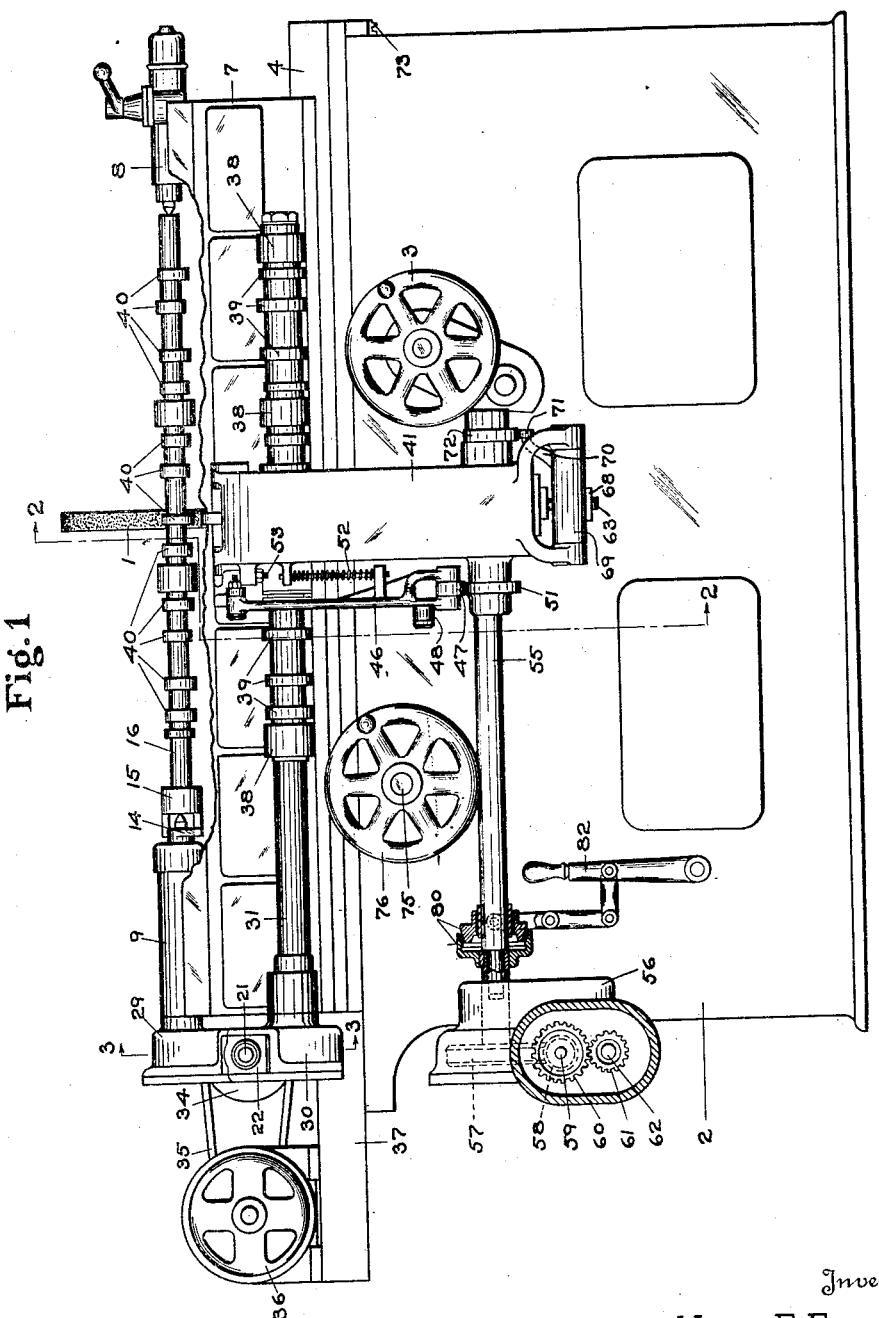

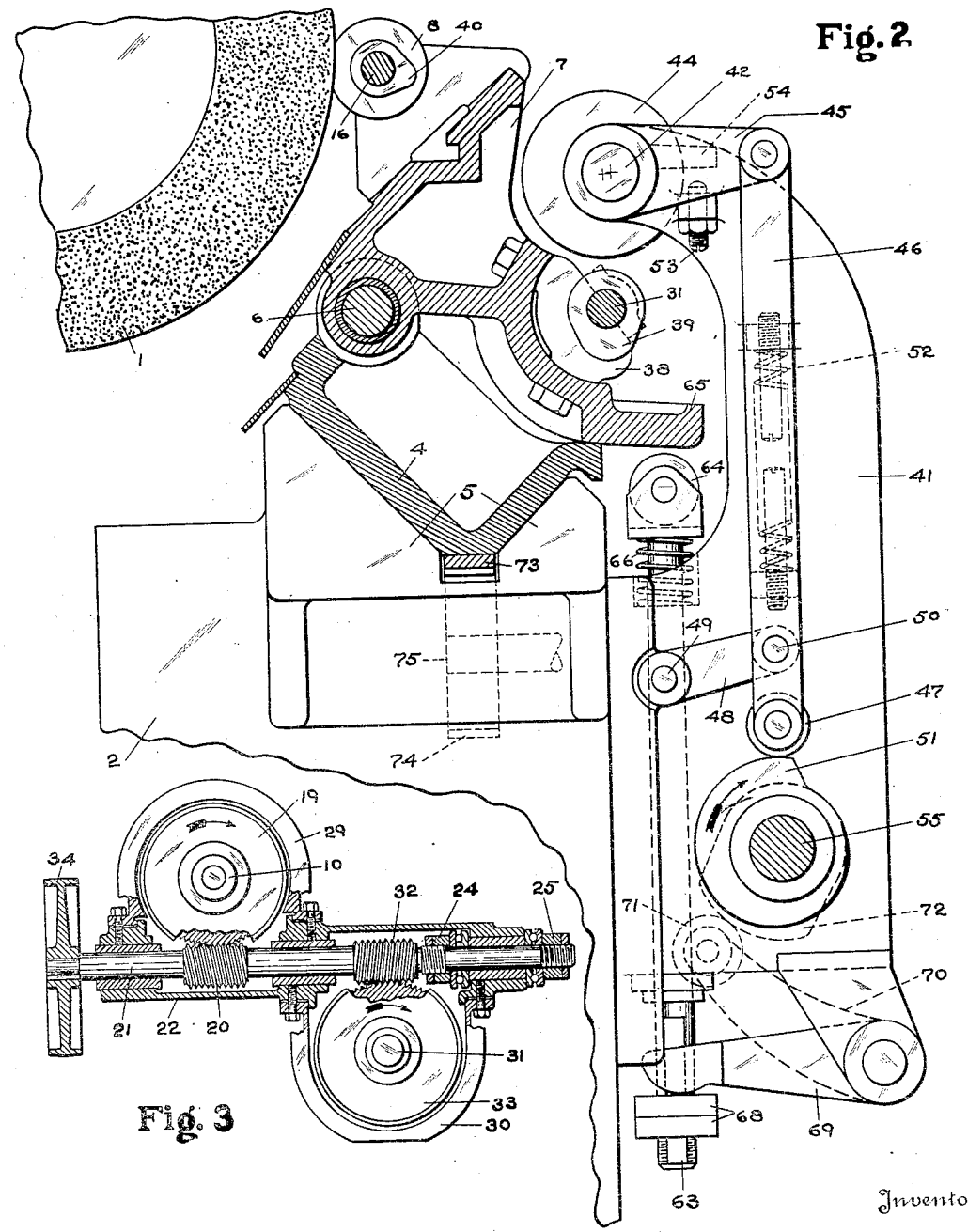

1,847,084

UNITED STATES PATENT OFFICE

WARREN F. FRASER, OF WESTBORO, MASSACHUSETTS, ASSIGNOR TO NORTON COMPANY, OF WORCESTER, MASSACHUSETTS, A CORPORATION OF MASSACHUSETTS

GRINDING MACHINE

Application filed June 21, 1928. Serial No. 287,203.

This invention relates to grinding machines of that type in which the carriage for the work piece and the grinding element are relatively moved in a path controlled by a master or model cam corresponding in its shape to the contour required in the finished piece, irregular or symmetrical as the case may be.

It is important that the relative movement of the grinding element and carriage should be effected and controlled with the greatest possible degree of precision; also that the work piece and master cam should be accurately and dependably mounted and driven in the proper timed relation and at uniform speed. The object of the present invention is to provide new and improved mechanism for effecting these results.

As herein shown, the carriage for the work piece is arranged to move toward and from the grinding element, although it will be understood that it is of secondary importance which of the two elements is moved but that it is the relative movement of the two with which this invention is particularly concerned. In its preferred embodiment, however, the master cam is mounted in the carriage adjacent to the work piece and arranged to be driven in synchronized relation with the work piece. The master cam runs upon the periphery of a curved follower which thus affords a definite point of reference with respect to which the master cam acts to move the carriage and the work piece being ground.

An important feature of the invention consists in a transversely movable carriage and a follower roll or other contact member disposed in cooperative relation to the master cam and maintained in continuous engagement therewith during each complete grinding operation, together with means for shifting the position of the follower without disturbing in any way its engagement with the master roll. Such construction serves with particular advantage for effecting the grinding feed movement of the parts without shock or lost motion but accurately, gradually and with extreme accuracy.

Preferably, the carriage is acted upon by yielding means which tends always to move it so as to establish contact between the master cam and its follower. In this connection, another feature of the invention consists in automatic mechanism for timing the action of said yielding means and for thereafter bodily shifting the position of the follower. This mechanism contributes largely to the success of an automatic machine by insuring positively proper timing of the functions discussed and by effecting them uniformly, insuring always the same degree of pressure between the master cam and follower and leaving no part of the grinding operation subject to the necessarily uneven control of the operator.

In another aspect, the invention consists in improved carriage mechanism for a fully automatic machine, for grinding a series of longitudinally spaced objects or blanks having a common axis of rotation such as collars, bearings or cams on a shaft. Such a machine is disclosed in my copending application Serial No. 279,162 filed May 19, 1928. While the mechanism herein shown can be used with particular advantage in connection with a machine of that type, it may be used equally well in connection with machines for grinding work pieces such as lenses, cams or machine parts having a single ground contour.

These and other features of the machine will be best understood and appreciated from the following description of a preferred embodiment thereof, selected for purposes of illustration and shown in the accompanying drawings, in which Fig. 1 is a view in front elevation of a complete grinding machine embodying the invention.

Fig. 2 is a view in end elevation, partly in section, on the line 2—2 of Fig. 1 and on an enlarged scale; and Fig. 3 is a sectional view on the line 3—3 of Fig. 1.

The machine illustrated is set up for grinding a work piece comprising a cam shaft 16 of an automobile engine having twelve cams 40 spaced longitudinally and unequally therein. The contour to be reproduced in the various individual cam blanks is derived from a series of spaced master cams 39 formed in a model shaft 31 disposed in parallel relation to the work shaft. Both the work shaft and the master shaft are mounted for rotation in a carriage which is arranged to swing toward and from a grinding wheel 1. The movement of the carriage toward and from the grinding wheel is controlled by the engagement of one of the model cams with a follower. The carriage with the work shaft and master shaft is movable longitudinally to present successive cam blanks in operative relation to the grinding wheel. In the machine herein disclosed, the longitudinal traverse of the carriage is effected manually by the operator, while in the fully automatic machine of my copending application above identified the longitudinal traverse of the carriage is effected automatically.

The grinding wheel 1 is mounted to be driven in any convenient manner and is also bodily movable transversely on the base 2 of the machine by means of a hand wheel 3 located within convenient reach of the operator. The mounting of the grinding wheel is not shown as it forms no part of the present invention and may be of any well-known commercial construction. It will be understood, however, that the adjusting movement of the grinding wheel permits it to be advanced as it is worn away in use or in dressing and that such adjustment is of a preliminary nature to be effected prior to setting up the machine for any particular piece of work.

Proceeding now to a more detailed description: The base of the machine comprises an elongated casing 2 carrying longitudinally extending ways 5, the faces of which converge obliquely at an inclination of about 45°, see Fig. 2. An elongated carriage slide 4 is supported in the ways 5 and provided with a longitudinally disposed pivot bar 6, upon which is pivotally mounted the carriage 7.

The carriage 7 is provided with work-supporting members comprising a foot-stock 8 and a head-stock 9, the latter having a driven work spindle 10 rotatably mounted therein. The spindle 10 is supported in suitable spindle bearings and has a driving arm or prong 14 adapted to engage a dog 15 or other driving device which may be clamped upon the work shaft 16. At its rear end, the spindle is keyed to a worm wheel 19, shown in Fig. 3, which is driven by a worm 20 on a transverse shaft 21 rotatably mounted in a frame or casing 22, which is adjustably secured to the housing 29 of the worm wheel 19. The shaft 21 is secured against endwise movement by an adjustable collar 25 threaded upon its outer end, and an adjustable collar 24 located within its forward bearing and serving to confine thrust bearings. The casing 22 is adjustably secured also to a housing 30 secured to or formed as a part of the carriage 7 and carrying one bearing for the master cam shaft 31. A second worm 32 on the shaft 21 drives a worm wheel 33 secured to the outer end of the model shaft.

The two worms 20 and 32 are of equal lead but opposite pitch and the worm wheels 19 and 33 have the same number of teeth. Accordingly, rotation of the worm shaft 21 drives the model shaft 31 and the spindle 10 in the same direction and at the same rate of speed. It will be apparent that by moving endwise the worm shaft 21 with the attached worms, one worm wheel will be advanced and the other retarded, thereby changing their angular relation or the timing of their rotation. This may be effected when desired by means of the adjustable collars 24 and 25 on the worm shaft 21.

The model shaft is rotatably mounted in a series of bearings in the carriage 7 and is removable and interchangeable for other shafts having differently shaped and arranged master cams or a single master cam according to the character of the work piece to be ground. The left end of the model shaft is carried by the bearing formed in the housing 30 and the other bearings 38 support the model shaft against deflection while in operation at various points in its length.

The worm shaft 21 is driven by a pulley 34 which, as shown in Fig. 1, is secured to its rear end and connected by a belt 35 to a motor 36 mounted upon an extension 37 of the carriage 7 and having flexible leads so that it may travel back and forth in the reciprocation of the carriage and also rock with it.

The center portion of the ways 5 is cut out to receive a rack 73 engaged by a pinion 74 on the inner end of a transverse shaft 75, which extends through the casing 2 of the machine and is provided at its forward end with a hand wheel 76 by which the operator may rotate the pinion 74 to move the carriage longitudinally to position the blank to be ground opposite to the grinding wheel 1.

A bracket 41 is rigidly secured to the casing 2 and has journaled in its upper end a shaft 42 having an eccentric portion which constitutes a journal for a rotatably mounted follower roll 44. The surface of the roll 44 constitutes the contact piece or point of reference with respect to which the carriage is moved by the operation of the master cam, as will presently appear. A forwardly-extending lever 45 is rigidly secured to the left end of the shaft 42 and pivotally connected at its upper end to a vertically disposed link 46, having at its lower end a cam roller 47 and guided for vertical motion by a link 48 pivotally connected to the bracket 41 by a stud 49, and to the vertical link by a stud 50. The link 46 is moved upwardly by a cam 51, upon which the roll 47 rests, and downwardly by a spring 52, extending between an ear on the bracket 41 and a corresponding ear on the link 46. The downward movement of the link and of the arm 45 is adjustably limited by means of a stop screw 53 set in an ear projecting from the bracket 41 and standing in the path of a projection 54 upon the lever 45.

The cam 51 is secured to a longitudinally extending shaft 55 which is journaled at one end in the bracket 41 and at the other in a housing 56 secured to the left side of the casing 2. The shaft 55 is made in two sections connected by a clutch 80 arranged to be shifted by a lever 82 through suitable connections. The outer end of the shaft 55 carries a worm wheel 57 meshing with a worm 58 on a transverse shaft 59. Any convenient source of power, such as an individual motor, may be utilized for driving the worm shaft 59. As herein shown, a driving shaft 62 is provided and change gears 60 and 61 are interposed between this and the worm shaft 59 so that, if desired, the speed of rotation of the shaft 55 may be varied.

The bracket 41 is provided with a vertically moving plunger 63, carrying at its upper end a roller 64 adapted to engage an outwardly projecting portion 65 on the rocking carriage 7 and to rock the carriage upwardly at the proper point in the cycle of the machine until its motion is arrested by the contact of the model cam 39 with the follower roll 44. The plunger 63 is moved upwardly by a compression spring 66 when such movement is permitted by controlling mechanism including a forked lever 69 which engages a pair of collars 68 threaded upon the lower end of the spindle. The opposite sides of the spindle are flattened and the forked lever prevents it from turning. The lever 69 has a cam arm 70 carrying a cam roll 71 at its free end which runs upon the contour of a second cam 72 on the cam shaft 55. The cam 72 is shaped to hold the spindle 63 in its lower or inoperative position, as shown in Fig. 2, during approximately 90° of the revolution of the shaft 55. In this position, the carriage 7 is free to move longitudinally for feeding the blank to be ground into a position opposite the grinding wheel 1.

It will be assumed that the carriage 7 with its slide 4 has been moved to a position in the ways 5 to bring a cam blank 40 opposite the grinding wheel and a master cam 39 opposite the follower roll 44 and that the work shaft 16 and model shaft 31 are driven at the same rate of speed. Now if the clutch 80 is engaged and the shaft 55 rotated in the direction of the arrow in Fig. 2, the cam roller 71 will drop off the cam 72, permitting the spindle 63 to move upwardly, under actuation of the spring 66, and swing the carriage 7 upwardly until the master roll 39 encounters the follower roll 44. Yielding action of the spindle 63 will thereafter maintain the contour of the master cam 39 against the periphery of the roll 44, swinging the carriage 7 back and forth about its pivot bar 6 and imparting an identical motion to the work shaft and the cam blanks therein.

In the movement of the carriage heretofore described, the cam blank is carried toward the grinding wheel to a point just out of touch with the grinding wheel. The nearer approach and engagement of the cam blank and grinding wheel or the grinding feed is brought about by bodily shifting the follower roll 44 so as to permit the carriage to rock further toward the grinding wheel. This is accomplished by the action of the cam 51, which in its rotation permits the link 46 gradually to move downwardly, swinging the shaft 42 in a clockwise direction, as seen in Fig. 2, and carrying the eccentric journal portion thereof upwardly. The follower roll 44 is thereafter moved bodily upwardly, or in other words its axis is displaced until its travel is limited by the projection 54 on the arm 45 coming in contact with the adjustable stop screw 53. When this point is reached, the grinding feed has progressed to a stage at which the cam blank being ground is rocked toward the grinding wheel sufficiently to insure complete grinding of its entire periphery to the required size.

After the completion of one complete grinding operation, the continued rotation of the shaft 55 and the cams carried thereby causes the plunger 63 to be again depressed and the carriage by its own weight returns to its initial angular position. The cam 51 is meantime acting again to elevate the link 46, returning the follower roll 44 also to its initial position remote from the carriage. The carriage is now free to be moved longitudinally to present a new blank in operative position or to remove the completely ground blank.

It will be apparent that the contours of the different blanks and their sizes are controlled by the contours and sizes of the master cams. If a cylindrical contour is desired in the work piece, as would be the case in grinding bearings or collars, the rotation of the model shaft would be unnecessary and may be dispensed with, or if cylindrical and irregular blanks are to be ground in the same work piece, corresponding cylindrical and irregular master cams may be provided.

The terms "follower" and "follower roll" are used herein for convenience to designate the roll 44 which cooperates with the master cam, and, since the roll follows always the contour of the master cam, the term is believed to be apt, although it is the cam and not the roll which moves bodily in operation. It will be apparent that any contact member or stop member acting to limit the initial rapid clearance movement of the carriage and being then positively moved to restrain the further movement of the carriage and convert it into a slow feeding movement would serve as well and be within the scope of the invention.

Having thus described my invention, what I claim is new and desire to secure by Letters Patent is:

1. A grinding machine comprising a grinding wheel and a work support, one of which is movable toward and from the other, and means on the work support for rotatably supporting a piece of work, and automatic mechanism, including a master cam and roller, arranged to move said movable member toward the other so as to control the contour of the work piece and means to automatically impart a secondary motion to said movable member to grind the work to a smaller size.

2. A grinding machine having, in combination, a grinding wheel, a carriage movable toward and from the wheel and having means for supporting a work piece, means including a master cam and a follower to move the carriage and control the shape of the work being ground, and means associated therewith to automatically impart a secondary motion to the work carriage and thereby reduce the work to a predetermined size.

3. A grinding machine comprising a grinding wheel, a carriage movable toward and from the wheel and having means for supporting a work piece, means including a master cam and a follower to move the carriage and control the shape of the work being ground, and a cam controlled means to automatically impart a secondary motion to the work carriage and thereby reduce the work to a predetermined size.

4. A grinding machine comprising a grinding wheel, a work supporting carriage movable toward and from the wheel, means including a master cam and a follower to move the carriage and thus control the shape of the work being ground, means associated therewith to impart a secondary motion to the work carriage and thereby cause the wheel to be fed into the work, and means including an adjustable member to limit the movement of the work carriage and thereby control the infeed of the wheel into the work.

5. A grinding machine comprising a grinding wheel, a work supporting carriage movable toward and from the wheel, means including a master cam and a follower to move the carriage and control the shape of the work being ground, a cam controlled means to impart a secondary motion to the work carriage and thereby cause the work to be fed into the wheel, and an adjustable stop device to limit the feeding movement of the work carriage and thereby control the infeed of the work into the wheel.

6. A grinding machine having, in combination, a grinding element, a pivotally mounted carriage movable relatively thereto and having means for supporting a work shaft, a master cam and follower cooperating to control the carriage movement, yielding means to swing said carriage toward the grinding wheel, and a cam mechanism for automatically retracting said yielding means after grinding.

7. A grinding machine having, in combination, a grinding element, a carriage movable relatively thereto and having a master shaft therein, cam controlled means for moving said carriage toward the grinding element at predetermined times, a contact member for controlling the approach of the carriage to the grinding element having an eccentric mounting, and means for turning said mounting to shift the position of the contact member.

8. In a grinding machine having a grinding element, a carriage arranged to swing toward and from said grinding element and carrying a work piece and a master shaft, a master follower roll mounted upon a movable axis and arranged to control the movement of said carriage, and two trains of cam controlled mechanism, one operative first to swing the carriage to move the master shaft into contact with the follower roll and the second acting thereafter to shift the axis of the follower roll to swing the work piece towards the grinding element to size the same.

9. In a machine for grinding irregular shapes, a grinding wheel and a carriage for a work piece movable freely relatively to each other, a master cam, and a follower roll arranged to turn about an axis which is movable in a predetermined path and being engaged by the master cam thereby controlling the relative position of the wheel and carriage, the path of movement of the roll being such as to cause a relative feeding movement between the wheel and work piece without disturbing the engagement of the master cam and follower roll.

10. A grinding machine comprising a grinding wheel, a work carriage movable relatively thereto, means including a master cam and follower for moving the carriage toward the grinding wheel to control the contour of the work, said follower being mounted for movement toward or from the master cam, and automatically actuated mechanism for moving said follower bodily so as to feed the work into the wheel.

11. A grinding machine comprising a grinding wheel and a work supporting carriage which are moved relatively to each other, means including a master cam and a follower to cause such work movement and to control the shape of the work, said follower being mounted for movement toward and from the axis of the master cam, automatically actuated means to move the follower toward and from the master cam, and an adjustable stop device to limit the movement of the follower when moved to feed the work towards the wheel so as to determine the work size without affecting the contour thereof.

12. In a machine for grinding irregular shapes, a grinding wheel, a movable carriage having the work piece rotatably mounted therein, a master cam also mounted in the carriage, a follower roll located adjacent to the carriage, means acting on the carriage to holds the master cam in engagement with the follower roll thereby controlling the position of the work piece with respect to the grinding wheel, and means for shifting the axis of the follower roll without disturbing the engagement of said cam and roll.

13. In a machine for grinding irregular shapes, a grinding wheel, a rocking carriage having the work piece rotatably mounted therein, a master cam also mounted in the carriage, a follower member for the master cam located adjacent to the carriage, means for yieldingly holding the carriage in position with the master cam in engagement with said follower thereby controlling the rocking movement of the carriage, and means for moving said follower in a predetermined path while the master cam is maintained in uninterrupted engagement therewith.

14. A grinding machine comprising a grinding wheel, a work support mounted for movement toward and from the wheel, means thereon for rotatably supporting a work piece, a master cam and follower to control the movement of the carriage toward and from the wheel and thus determine the shape of the work being ground, means to hold the master cam and follower in contact and to move the carriage toward the grinding wheel, and an automatically actuated cam operated mechanism to cause the master cam and roller to separate and thereby permit replacement of the work in the machine.

15. In a machine for grinding irregular shapes, a frame, a grinding wheel, a rocking carriage for the work piece, a master cam and follower one mounted on the carriage and the other on the machine frame, yielding means for swinging the carriage to establish contact of said cam and follower, and automatic mechanism for withdrawing said yielding means and rendering it inoperative during a predetermined portion of the cycle of the machine.

16. In a machine for grinding irregular shapes, a frame, a grinding wheel, a rocking carriage for the work piece, a master cam and follower one mounted in the carriage and the other on the machine frame, yielding means for swinging the carriage to establish contact of said cam and follower, and automatic mechanism for timing the action of said yielding means and for thereafter bodily shifting the position of the follower.

17. In a grinding machine having a rocking carriage, a follower and a spring actuated plunger between which a portion of the carriage is disposed, means for successively retracting and releasing said plunger causing the carriage to rock away from and then toward the follower, and automatic mechanism for moving the follower at a predetermined interval after each release of said plunger.

18. In a grinding machine having a transversely movable carriage, a master cam mounted in the carriage, a follower roll located opposite to said master cam and rotatable about an eccentrically mounted journal, an arm connected to said journal, cam actuated means for swinging said arm to move said journal in one direction having a connected spring for moving the arm in the other direction, and a positive but adjustable stop for limiting the movement of the arm in said other direction.

19. In a grinding machine having a rotatable grinding wheel, a rocking work supporting carriage, a master cam mounted in the carriage, a contact member disposed opposite said master cam, and automatically actuated cam mechanism for moving the contact member toward the master cam at the conclusion of the grinding operation to rock the carriage to an inoperative position.

20. In a grinding machine having a rotatable grinding wheel, a rocking work supporting carriage, a master cam mounted in the carriage, a contact member disposed opposite said master cam, and an automatically actuated cam mechanism for moving the contact member toward the master cam at the conclusion of one grinding operation and the master cam into engagement with the contact member prior to the ensuing grinding operation.

21. A grinding machine comprising a grinding wheel, a carriage for supporting a product cam shaft in operative relation to the wheel, a master cam shaft on the carriage, a driving mechanism, connections between said mechanism and each of said shafts, and means for varying the relative timing of said shafts.

22. A grinding machine having, in combination, a grinding wheel, a carriage for supporting a product cam shaft in operative relation to the wheel, a master cam shaft of the carriage, and driving connections between said shafts comprising a worm gear secured to each shaft, and a shaft having intermeshing worms, and means for bodily moving the worm shaft to change the relative timing of said shafts.

23. A grinding machine having, in combination, a grinding element, a rocking carriage movable relatively thereto and having means for supporting a work piece, a master cam and follower cooperating to control the carriage movement, yielding means tending to rock said carriage toward the grinding wheel, and cam mechanism for moving said follower through a predetermined path to feed the work piece toward and from the grinding wheel.

24. A grinding machine having, in combination, a grinding element, a rocking carriage movable relatively thereto and having means for supporting a work piece, a master cam and follower cooperating to control the carriage movement, yielding means tending to rock said carriage toward the grinding wheel, cam mechanism for moving said follower in a predetermined path to feed the work piece toward the grinding wheel, and means for positively limiting the in-feed motion of the work piece independently of the cam mechanism.

25. In a grinding machine, the combination with a work support, of a carriage for a grinding element, a contact member, and means for rapidly relatively moving the carriage and support toward each other until one encounters the contact member, said member thereupon acting to limit said rapid movement and being thereafter bodily moved at a slow rate to constrain it to a slow movement.

26. In a grinding machine, the combination with a base, of a work support and grinding element mounted thereon for relative approaching and separating movement, and mechanism including a stop for causing the approaching movement thereof to take place in two steps, one at high speed and one at low speed, said mechanism acting independently of the stop to cause the complete separating movement to take place in a single high speed stop.

27. A grinding machine comprising a grinding wheel, a carriage movable relatively thereto, cam controlled means for moving said carriage toward the grinding wheel at predetermined times to establish the initial grinding relation of the work and the grinding wheel, a master cam and a follower for controlling the movement of the carriage during grinding to produce a predetermined contour on the work piece, and means to automatically move said follower bodily and thereby produce a feeding movement of the carriage to size the work piece.

28. A grinding machine comprising a grinding wheel, a carriage movable relative thereto and having a product cam shaft and a master cam shaft support thereon, a follower cooperating with said master shaft for controlling the movement of the carriage, yieldable means to move said carriage toward the grinding wheel and to hold the master cam shaft in contact with the follower, a cam device to control the movement of said yieldable means to and from an operative position before and after the grinding operation, and means to automatically move the follower bodily and thereby produce a feeding movement of the carriage to size the work piece.

Signed at Worcester, Massachusetts, this 15th day of June, 1928.

WARREN F. FRASER.